Feb. 4, 1930.  C. CLENCH ET AL  1,746,105
REMOTE LIQUID LEVEL INDICATOR
Filed Dec. 22, 1924
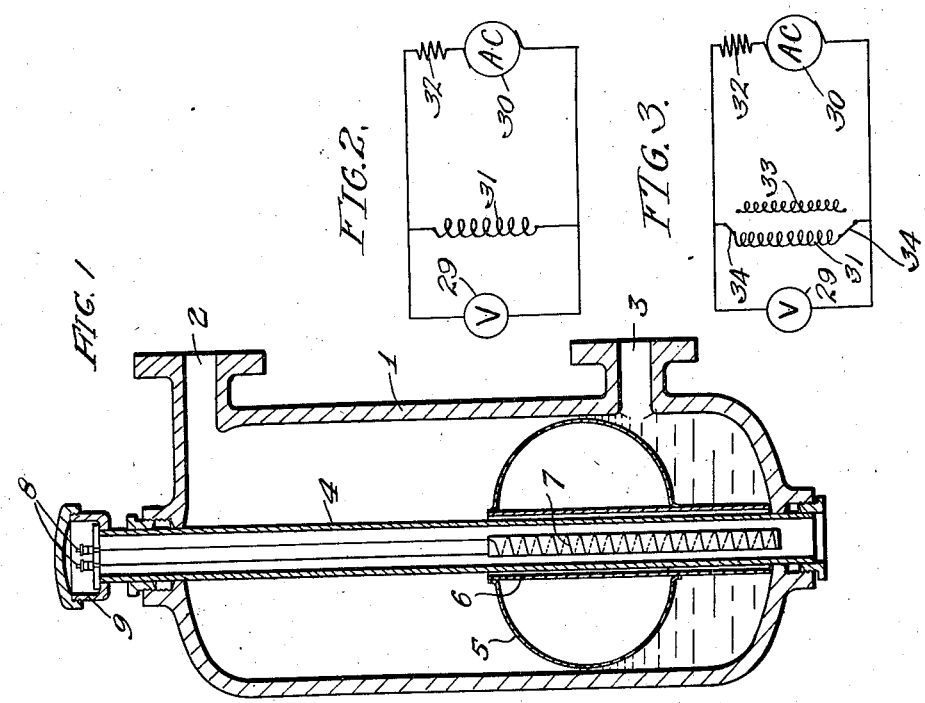

Patented Feb. 4, 1930

1,746,105

UNITED STATES PATENT OFFICE

CLAUDE CLENCH AND WALTER SMITH, OF WEMBLEY, ENGLAND

REMOTE LIQUID-LEVEL INDICATOR

Application filed December 22, 1924, Serial No. 757,499, and in Great Britain May 22, 1924.

This invention relates to improvements in apparatus for indicating electrically at a distance fluctuations in the level of water or other liquid in a boiler, tank or like container, the apparatus being of the kind which employs inductance and comprises a variable electrical resistance or impedance located in an electric circuit that includes a suitable electrically operated instrument, arranged in a position remote from the liquid receptacle and adapted to indicate or record, or both indicate and record such fluctuations, and which apparatus includes means for automatically varying in amount the resistance or impedance in the circuit in accordance with changes in the level of the liquid in the receptacle.

In apparatus according to the present invention the electrical resistance or impedance has the form of a choking coil conveniently located in the electric circuit, the amount of resistance being varied by the increase or decrease in the choking action of or the inductance in the coil. The increase or decrease in the choking action of the coil is effected by means of the movement of a single rigid non-magnetic metal sheath or shield conveniently disposed about the coil, the movement being in accordance with the variations in level of the liquid in the receptacle or container. The metal sheath or shield has the form of a displacement device or float arranged in a chamber that is in communication with the liquid in the container and is operated directly by the liquid. The shield is thus caused to move relatively to the coil in sympathy with the rise or fall of the liquid level, the corresponding variation in the reading of the instrument indicating or recording, or both indicating and recording the change in level of the liquid. Such instrument may be calibrated to read in tons, gallons, inches or other desired measure.

In the foregoing arrangements the chamber, the choking coil, or coils, the shielding means and the float would together constitute a unit which is hereinafter termed an actuator, which acts inductively and comprises a single moving member which is devoid of any mechanical contact and magnetic attraction with any other part of the indicating apparatus.

The invention will be further described with reference to the accompanying drawings, in which:—

Fig. 1 is a section through an actuator which is particularly suitable for use where small variations in level are to be indicated or recorded, or both indicated and recorded.

Fig. 2 is a diagram showing the electrical connections between the actuator, the associated indicating or recording instrument and the source of current supply.

Fig. 3 shows a method of correcting the zero of the instrument when used on an electrical supply subject to considerable fluctuations.

The actuator shown in Fig. 1 consists of a chamber 1 which communicates by means of branches 2 and 3 at its upper and lower ends, respectively, with steam and water spaces of a boiler, which is not shown. Extending down the centre of the chamber for a greater or less length is a tube 4 which is formed of any suitable material, for instance bronze. The tube may have its bore open to the atmosphere, and be suitably packed where it passes through the ends of the chamber. Around this tube is disposed a float 5 carrying a metal sheath 6 which is preferably in the form of a copper tube or sleeve, which sheath has a distinctly easy fit on the tube 4, so as to readily respond to small changes of level.

In the bore of the tube 4 is housed a choking coil 7 in such a manner that it is shielded by the tube 6 when the float is in its lowest position as in Fig. 1, or the choke coil may be so arranged that it is shielded by the tube 6 when the float is in its highest position. It is obvious that the level of the liquid in the chamber of the actuator will at all times be the same as the level of the water in the boiler and the float 5 will therefore take up a position dependent upon the water level at any particular moment. It is therefore clear that the choking coil 7 will be more or less shielded or enveloped by the copper tube forming part of the float, the length of the coil thus shielded being dependent upon the water level obtaining at any particular moment. The ends or terminals 8 of the choking coil are brought out to a junction box 9 and connected to a source of an alternating or an intermittent or pulsating electric current. Connected across these terminals is an indicating and/or recording instrument, such as a voltmeter suitably calibrated; and of any appropriate known kind, and such instrument, which is not shown in Fig. 1, may be placed any desired distance from the actuator. The voltage across these terminals will vary in accordance with the movement of the float up and down the tube or sleeve 4, which movement will be imparted to the float 5 by changes in the level of the liquid. It is therefore obvious that the changes in the water level in the actuator and therefore in the boiler may be read off directly from the voltmeter by suitably calibrating the voltmeter in inches and in subdivision thereof, or in other measurement denominations. The diameter of the choking coil may be such that it does not completely fill the bore of the bronze tube, in order that a current of air may pass upwards through the tube and produce a cooling effect on the coil.

Fig. 2 is a diagram showing the electrical connections between the actuator (which in this figure is denoted diagrammatically by the reference numeral 31), the indicating and/or recording instrument 29, and a source of current supply 30. The electric circuit may include a suitable resistance 32.

Where extreme accuracy is required it may be necessary to correct for slight variations in the voltage and frequency of the electrical supply. For this purpose the arrangement of electric connections depicted in Fig. 2 may be modified, as shown for example in Fig. 3, by arranging an auxiliary choking coil 33 in the circuit, which coil has a known inductance value. Before taking the reading the indicator is, by operating switches 34, switched over to the second or auxiliary coil 33 and the reading noted. Should its value be above or below the known reading obtained when the electric supply is normal, the error is noted and the reading corrected in accordance therewith.

Having thus described the nature of the said invention and the best means we know of carrying the same into practical effect, we claim:—

1. In an apparatus for indicating at a distance fluctuations in the level of liquid in a boiler, the combination of a liquid-contaning chamber having its upper and lower ends connected, respectively, with the steam and liquid spaces of the boiler and wherein the level of the liquid rises and falls with the rise and fall of the level of the liquid in the boiler, an upright tube extending within said chamber, a choking coil housed within said tube and spaced from the latter, and means operated directly by the rise and fall of the liquid in said chamber for automatically varying the choking action of said coil.

2. In an apparatus for indicating at a distance fluctuations in the level of the liquid in a boiler, the combination of a chamber having its upper and lower ends connected, respectively, with the steam and liquid spaces of the boiler to receive from the boiler liquid of which the level rises and falls with the rise and fall of the liquid in the boiler, a tube closed from end to end and extending substantially vertically through said chamber and having its bore open to the atmosphere, a choking coil housed within said tube, and means for varying automatically the choking action of said coil in accordance with the movements of the liquid, said last-named mean comprising a float movable lengthwise of said tube and a non-magnetic sheath encircling a portion of the length of the tube, said sheath being attached to said float and adapted to shield more or less of the length of said coil in accordance with the rising and falling movements of the liquid and float in said chamber.

3. In an apparatus for indicating at a distance fluctuations in the level of the liquid in a boiler, the combination of a chamber connected at its upper and lower ends, respectively, with the steam and liquid spaces of the boiler and wherein the liquid level rises and falls with the liquid in the boiler, a tube in said chamber extending upwardly from the bottom of the chamber toward the top thereof and closed from end to end, a choking coil housed within said tube and spaced therefrom, and means for varying automatically the choking action of the coil in accordance with the rise and fall of the level of the liquid in said chamber, said last-named means comprising a float movable lengthwise of the tube and a non-magnetic metal sheath attached to the float and encircling the tube, said sheath being adapted, during the rising and falling of the liquid level in said chamber, to shield more or less of the length of the coil.

In testimony whereof we have signed our names to this specification.

CLAUDE CLENCH.
WALTER SMITH.